(No Model.)

M. GUIET.
ADJUSTABLE SEAT FOR VEHICLES.

No. 354,860. Patented Dec. 21, 1886.

WITNESSES:
Donn Twitchell.
G. Sedgwick

INVENTOR:
M. Guiet
BY Munn & Co.
ATTORNEYS.

UNITED STATES PATENT OFFICE.

MICHEL GUIET, OF PARIS, FRANCE, ASSIGNOR TO HEALEY & CO., OF NEW YORK, N. Y.

ADJUSTABLE SEAT FOR VEHICLES.

SPECIFICATION forming part of Letters Patent No. 354,860, dated December 21, 1886.

Application filed April 24, 1886. Serial No. 200,101. (No model.)

*To all whom it may concern:*

Be it known that I, MICHEL GUIET, of Paris, in the Republic of France, have invented a new and useful Improvement in Adjustable Seats for Wheeled Vehicles, of which the following is a full, clear, and exact description.

This invention more particularly relates to the seats of two-wheeled carts or vehicles—that is to say, to that class of two-wheeled vehicles which are provided with a front seat and a rear seat, the one of which has a fixed position and the other of which is adjustable relatively to or from and over the fixed seat, for the purpose of balancing the vehicle or regulating the position of the load according to circumstances, or as only one or both seats are in requisition.

The invention consists in certain means for controlling and securing the sliding or movable seats of these and other vehicles, substantially as hereinafter described, whereby a much easier and quicker adjustment of the movable seat and release and hold of it is obtained.

Reference is to be had to the accompanying drawings, forming a part of this specification, in which similar letters of reference indicate corresponding parts in all the figures.

Figure 1:
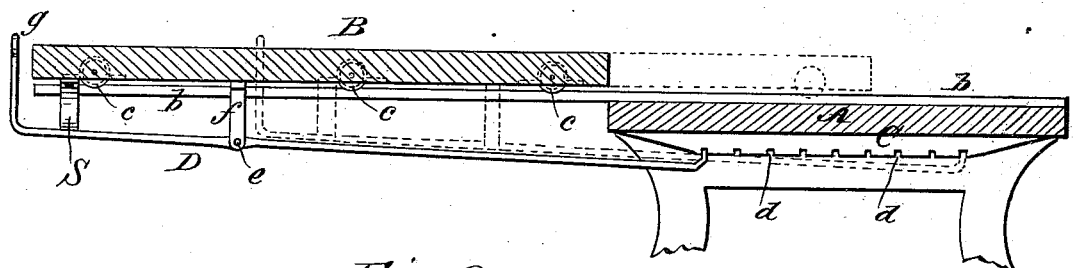
Figure 2:
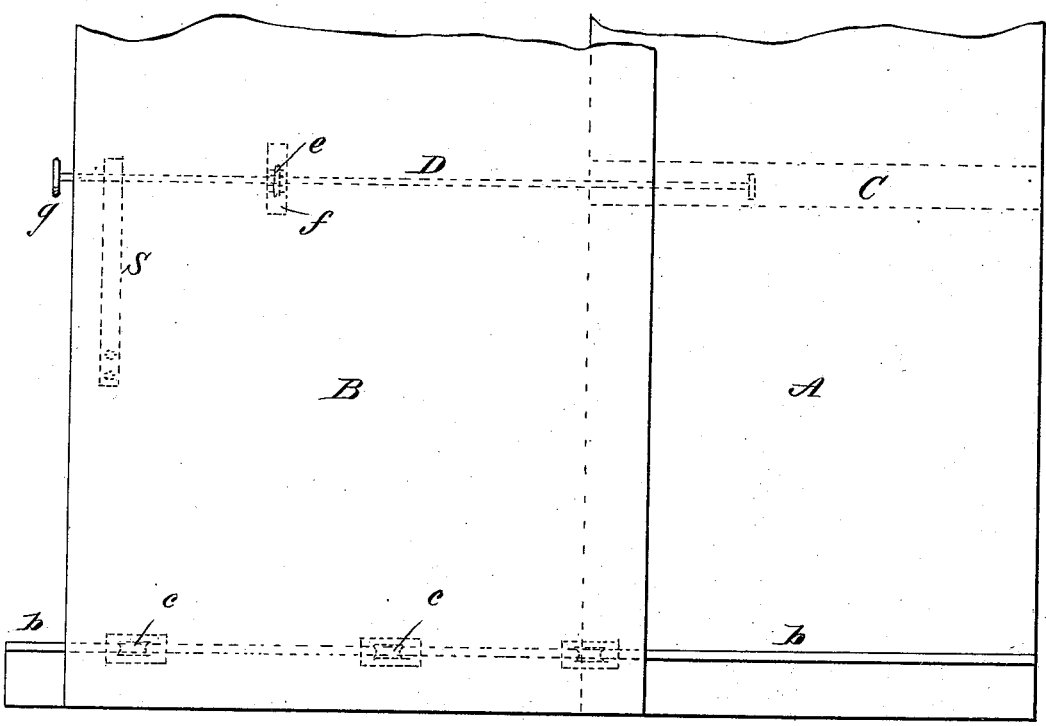
Figure 3:
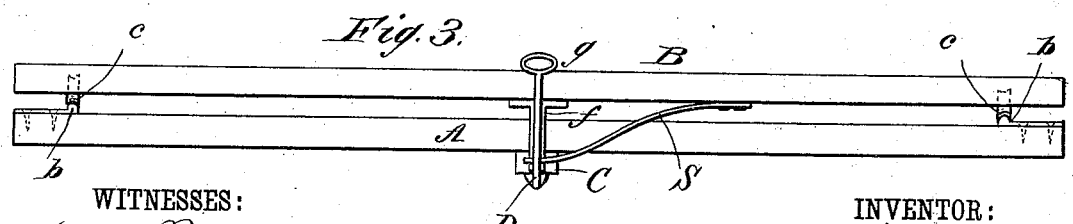

Figure 1 represents a vertical section, viewed in direction of the length of the vehicle, of a fixed and movable seat with the invention applied. Fig. 2 is a partial plan view of the same, and Fig. 3 a front view of like parts.

A indicates the fixed seat of a vehicle, and B the sliding or movable seat thereof, capable of adjustment toward or from and over the fixed seat A, for the purpose of changing the center of gravity or disposition of the load carried by the seat.

Arranged upon and across the end portions of the seat A, and extending beyond said seat, are tracks $b\ b$, upon which the sliding seat B is free to move by rollers or travelers $c\ c$, carried by it, thus securing an easy movement backward or forward of the seat B, and avoiding all twisting and sticking of the same.

C is a fixed block, which may be arranged underneath the stationary seat A. This block is provided with a series of notches, $d$, disposed one in advance of the other, and with any one of which a lever spring-catch connected with the movable seat B is made to engage, according to the forward or backward adjustment of the movable seat, as shown, for its two extreme adjustments, by full and dotted lines in Fig. 1. This spring-catch consists of a lever, D, arranged to cross beneath the seat B at or about its center, and having an intermediate pivot or fulcrum, $e$, in a stay or projection, $f$, on the under side of said seat. The rear end of said lever is bent to engage with the notches $d$ in the block C, while its front end is shaped to form a handle, $g$. A spring, S, of any suitable kind, attached to the bottom of the seat B and bearing on or connected with the lever D, serves to throw and hold up the rear end of said lever to automatically engage it with any one of the notches $d$ in the block C, according to the required adjustment of the seat. By simply lifting on the front end of the lever D said lever or spring-catch is released from engagement with the many-notched block or keeper C, which admits of the seat B being moved backward or forward, as desired, and on releasing said lift of the lever the latter is sprung into engagement with the block C to hold the seat in its adjusted position. These form a very simple and efficient means for securing and releasing the movable seat and for admitting of the adjustment of the latter, as required, in a rapid and easy manner.

Having thus fully described my invention, what I claim as new, and desire to secure by Letters Patent, is—

1. The combination, with a fixed seat provided with tracks upon its end portions and projecting therefrom, of a movable seat provided with rollers and mounted upon the said tracks, substantially as described, whereby the said movable seat can be adjusted to or from and over the fixed seat, as set forth.

2. The combination, with the fixed seat A, provided with the tracks $b$ on its upper surface and projecting therefrom, and the notched block C on its under surface, of the movable seat B, provided with the rollers $c$, the lever-catch D, pivoted to the under side of the movable seat, and the spring S, secured to the under side of the movable seat and engaging the lever-catch D, substantially as herein shown and described.

MICHEL GUIET.

Witnesses:
ROBT. M. HOOPER,
A. C. WATKINS.